US 7,856,535 B2

(12) United States Patent
Shen et al.

(10) Patent No.: US 7,856,535 B2
(45) Date of Patent: Dec. 21, 2010

(54) ADAPTIVE SNOOP-AND-FORWARD MECHANISMS FOR MULTIPROCESSOR SYSTEMS

(75) Inventors: Xiaowei Shen, Hopewell Junction, NY (US); Karin Strauss, Urbana, IL (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 12/176,963

(22) Filed: Jul. 21, 2008

(65) Prior Publication Data

US 2009/0089512 A1    Apr. 2, 2009

Related U.S. Application Data

(63) Continuation of application No. 11/178,924, filed on Jul. 11, 2005, now Pat. No. 7,437,520.

(51) Int. Cl.
    *G06F 12/00*    (2006.01)
(52) U.S. Cl. ...................... 711/146; 711/119; 711/141
(58) Field of Classification Search ......... 711/118–120, 711/141, 146
    See application file for complete search history.

(56) References Cited

U.S. PATENT DOCUMENTS

| 7,174,430 | B1 * | 2/2007 | O'Krafka et al. ............ 711/141 |
| 2003/0065843 | A1 * | 4/2003 | Jones et al. ................. 710/107 |
| 2005/0240735 | A1 * | 10/2005 | Shen et al. .................. 711/144 |

* cited by examiner

*Primary Examiner*—Jasmine Song
(74) *Attorney, Agent, or Firm*—F. Chau & Associates, LLC

(57) ABSTRACT

In a network-based cache-coherent multiprocessor system, when a node receives a cache request, the node can perform an intra-node cache snoop operation and forward the cache request to a subsequent node in the network. A snoop-and-forward prediction mechanism can be used to predict whether lazy forwarding or eager forwarding is used in processing the incoming cache request. With lazy forwarding, the node cannot forward the cache request to the subsequent node until the corresponding intra-node cache snoop operation is completed. With eager forwarding, the node can forward the cache request to the subsequent node immediately, before the corresponding intra-node cache snoop operation is completed. Furthermore, the snoop-and-forward prediction mechanism can be enhanced seamlessly with an appropriate snoop filter to avoid unnecessary intra-node cache snoop operations.

14 Claims, 8 Drawing Sheets

ADAPTIVE SNOOP-AND-FORWARD MECHANISMS FOR MULTIPROCESSOR SYSTEMS

CROSS-REFERENCE TO RELATED APPLICATIONS

This is a Continuation Application of U.S. application Ser. No. 11/178,924, filed on Jul. 11, 2005, now U.S. Pat. No. 7,437,520 the disclosure of which is herein incorporated by reference in their entirety.

GOVERNMENT RIGHTS STATEMENT

This invention was made with Government support under Contract No.: (NBCH 30390004) awarded by (PERCS Phase 2). The Government has certain rights in this invention.

BACKGROUND OF THE INVENTION

1. Field of the Invention

The present invention relates to cache coherence mechanisms, and, more particularly, to adaptive snoop-and-forward mechanisms for multiprocessor systems.

2. Description of the Related Art

A symmetric multiprocessor ("SMP") system employs a cache coherence mechanism to ensure cache coherence. When a read cache miss occurs, the requesting cache broadcasts a cache request to its peer caches and to the memory. When a peer cache receives the cache request, the peer cache performs a cache snoop operation and produces a cache snoop response indicating whether the requested data is found in the peer cache and the state of the corresponding cache line. If the requested data is found in a peer cache, the peer cache may source the data to the requesting cache via a cache intervention. The memory is responsible for supplying the requested data if the requested data cannot be supplied by any peer cache.

Referring now to FIG. 1, an exemplary cache-coherent multiprocessor system 100 is shown that comprises multiple nodes interconnected via an interconnect network, wherein each node comprises a central processing unit ("CPU") and a cache. The interconnect network can be a shared bus or a message-passing network such as a torus network. Also connected to the interconnect network are a memory and some input/output ("I/O") devices. Although the memory is depicted as one component, the memory can be physically distributed into multiple memory portions, wherein each memory portion is operatively associated with a node.

Referring now to FIG. 2, another exemplary cache-coherent multiprocessor system 200 is shown that comprises multiple nodes interconnected via an inter-node interconnect, wherein each node comprises a chip multiprocessor ("CMP") subsystem. The inter-node interconnect network can be a shared bus or a message-passing network such as a torus network. Each CMP subsystem comprises one or more caches that can communicate with each other via an intra-node interconnect (also referred to as intra-node fabric). A memory portion, as well as some input/output devices, can also be connected to the intra-node fabric.

For the purposes of the present invention, a cache is referred to as a requesting cache of a cache request, if the cache request is originally generated from the cache. Likewise, a node is referred to as a requesting node of a cache request, if the cache request is originally generated from a cache in the node. A cache request can be a read request that intends to obtain a shared copy of requested data, a read-with-intent-to-modify request that intends to obtain an exclusive copy of requested data, and an invalidate request that intends to invalidate shared copies of requested data in other caches.

A number of techniques for achieving cache coherence in multiprocessor systems are known to those skilled in the art, such as snoopy cache coherence protocols. For example, the MESI snoopy cache coherence protocol and its variants have been widely used in SMP systems. As the name suggests, MESI has four cache states: modified (M), exclusive (E), shared (S) and invalid (I). If a cache line is in an invalid state in a cache, the data is not valid in the cache. If a cache line is in a shared state in a cache, the data is valid in the cache and can also be valid in other caches. This state is entered, for example, when the data is retrieved from the memory or another cache, and the corresponding snoop responses indicate that the data is valid in at least one of the other caches. If a cache line is in an exclusive state in a cache, the data is valid in the cache, and cannot be valid in any other cache. Furthermore, the data has not been modified with respect to the data maintained in the memory. This state is entered, for example, when the data is retrieved from the memory or another cache, and the corresponding snoop responses indicate that the data is not valid in any other cache. If a cache line is in a modified state in a cache, the data is valid in the cache and cannot be valid in any other cache. Furthermore, the data has been modified as a result of a memory store operation, and the modified data has not been written to the memory.

When a cache miss occurs, if the requested data is found in both memory and another cache, supplying the data via a cache intervention is often preferred because cache-to-cache transfer latency is usually smaller than memory access latency. For example, in the IBM® Power 4 system, when data of an address is shared in at least one cache in a multichip module, the cache with the last shared copy can supply the data to another cache in the same module via a cache intervention.

In a modern SMP system, caches generally communicate with each other via a message-passing network instead of a shared bus to improve system scalability and performance. In a bus-based SMP system, the bus behaves as a central arbitrator that serializes all bus transactions to ensure a total order of bus transactions. In a network-based SMP system, in contrast, messages can be received in different orders at different receiving caches. One skilled in the art will appreciate that appropriate ordering of coherence messages is generally needed for efficient cache coherence support.

To support cache coherence in SMP systems in which caches are interconnected via a message-passing network, one promising approach is to rely on a particular network topology that can guarantee certain desirable message-passing ordering. For example, consider an SMP system in which caches communicate with each other via a unidirectional ring. When a first cache intends to broadcast a message, the first cache sends the message to a second cache, which is the subsequent cache to the first cache in the unidirectional ring. The second cache receives the message and then forwards the message to a third cache, which is the subsequent cache to the second cache in the unidirectional ring. The process continues like so with further subsequent caches in the unidirectional ring until the message is delivered to all the caches.

It becomes apparent that the unidirectional ring topology ensures the so-called triangle ordering, assuming in-order message passing from a cache to its subsequent cache in the unidirectional ring. With triangle ordering, if cache A sends a first message to caches B and C, and cache B receives the first message from cache A and then sends a second message to cache C, it is guaranteed that cache C receives the first message from cache A before receiving the second message from cache B. It can be shown that triangle ordering provides effective support for cache coherence implementation.

The approach of relying on message-passing ordering guarantee of a unidirectional ring can be extended to a hierarchical cache-coherent multiprocessor system. For example, consider an SMP system that includes multiple chips, wherein each chip includes multiple processors and caches. Within the chip boundary, a chip can use a central arbiter for intra-chip cache coherence. The central arbiter behaves as a bus that serializes outgoing cache requests issued from the chip. Beyond the chip boundary, a unidirectional ring is used to pass inter-chip cache requests and cache snoop responses.

In such a hierarchical system, when a cache miss occurs in a cache, the cache sends a request to the on-chip central arbiter. The central arbiter sends a coherence message to other caches on the same chip. The central arbiter determines that a cache request cannot be serviced locally, if requested data is not found in any on-chip cache for a read cache miss, or exclusive ownership is not found in any on-chip cache for a write cache miss. In this case, the central arbiter issues an appropriate inter-chip cache request that will be passed to all other chips via a unidirectional ring. The central arbiter can ensure that a chip can have at most one outstanding cache request regarding the same address.

One potential drawback of using a unidirectional ring is the overall latency to service a read request, especially when the sourcing cache that services the read request is far away in the unidirectional ring from the requesting cache. Therefore, it is generally desirable to develop a mechanism that can effectively reduce the overall latency of servicing a cache request, with reasonable bandwidth consumption.

SUMMARY OF THE INVENTION

In one aspect of the present invention, a system of adaptive snoop-and-forward is provided. The system includes a node comprising at least one cache; a preceding node; a subsequent node; an interconnect network operatively connecting the node, the preceding node and the subsequent node, wherein the preceding node is preceding to the node in the interconnect network, and wherein the subsequent node is subsequent to the node in the interconnect network; and an adaptive snoop-and-forward mechanism comprising a snoop-and-forward prediction mechanism, wherein, when the node receives a cache request from the preceding node, the snoop-and-forward prediction mechanism determines one of lazy forwarding or eager forwarding be used in handling the cache request.

In another aspect of the present invention, a cache-coherent multiprocessor system is provided. The system includes at least one node; an interconnect network operatively connected with the at least one node, wherein the at least one node communicates with one another via message passing on the interconnect network; wherein the interconnect network comprises at least one unidirectional ring, each communication link in the at least one unidirectional ring corresponding to a link in the interconnect network; wherein, given a memory address, the at least one unidirectional ring comprises a corresponding unidirectional ring, the corresponding unidirectional ring being used to send all cache requests of the memory address.

In yet another aspect of the present invention, a method of adaptive snoop-and-forward is provided. The method includes the steps of receiving a cache request from a preceding node; predicting whether one of lazy forwarding or eager forwarding should be used in handling the cache request; if lazy forwarding if predicted, (a) performing an intra-node cache snoop operation to generate an intra-node cache snoop response, the intra-node cache snoop response indicating whether requested data of the cache request can be supplied, and (b) forwarding the cache request to a subsequent node after the intra-node cache snoop response becomes available; and if eager forwarding is predicted, (a) forwarding the cache request to a subsequent node, and (b) performing an intra-node cache snoop operation to generate an intra-node cache snoop response, the intra-node cache snoop response indicating whether requested data of the cache request can be supplied.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Figure 1:
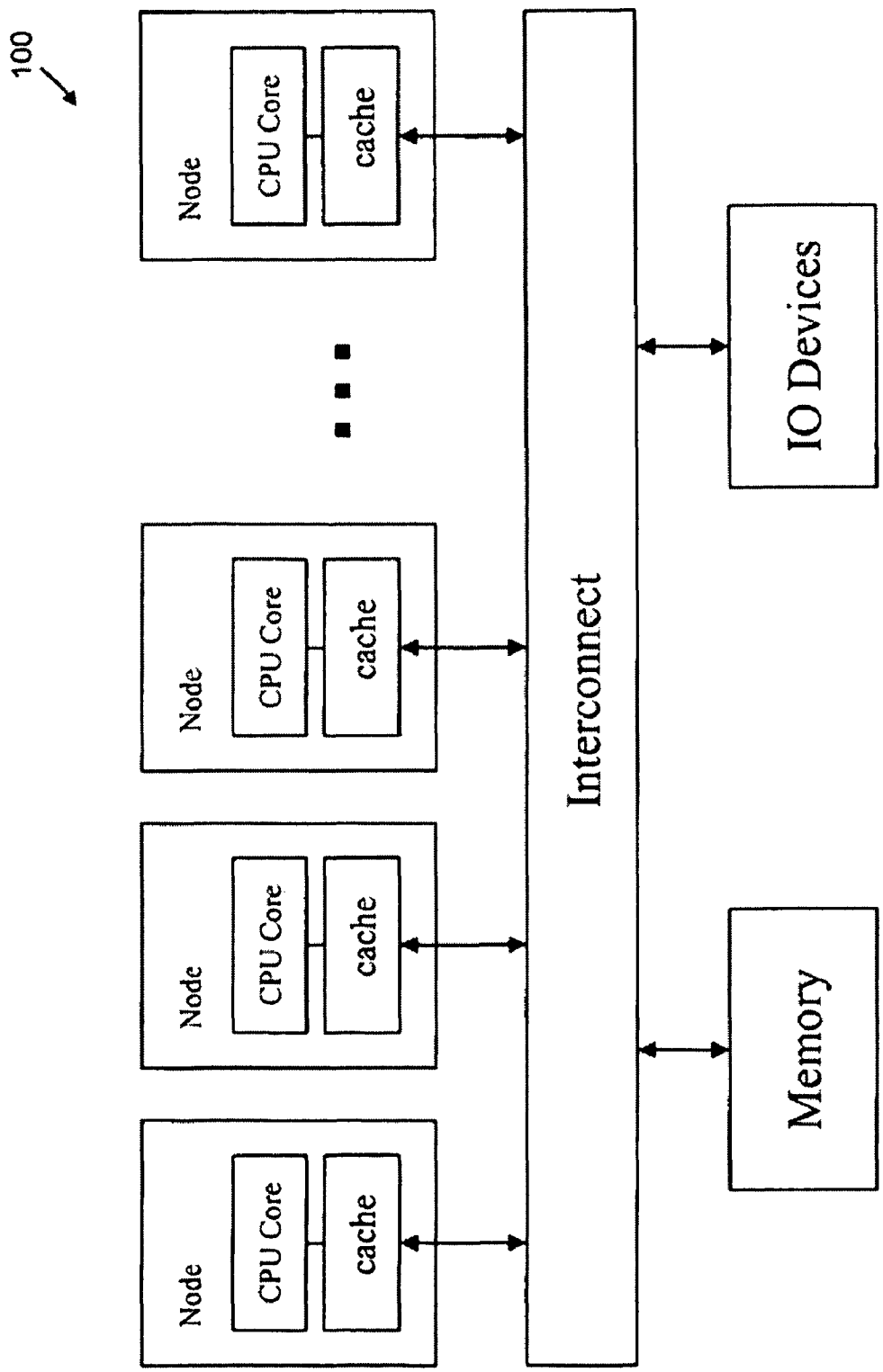
FIG. 1 depicts an exemplary SMP system that comprises multiple nodes connected with one another via an interconnect, wherein each node comprises a CPU and a cache.
Figure 2:
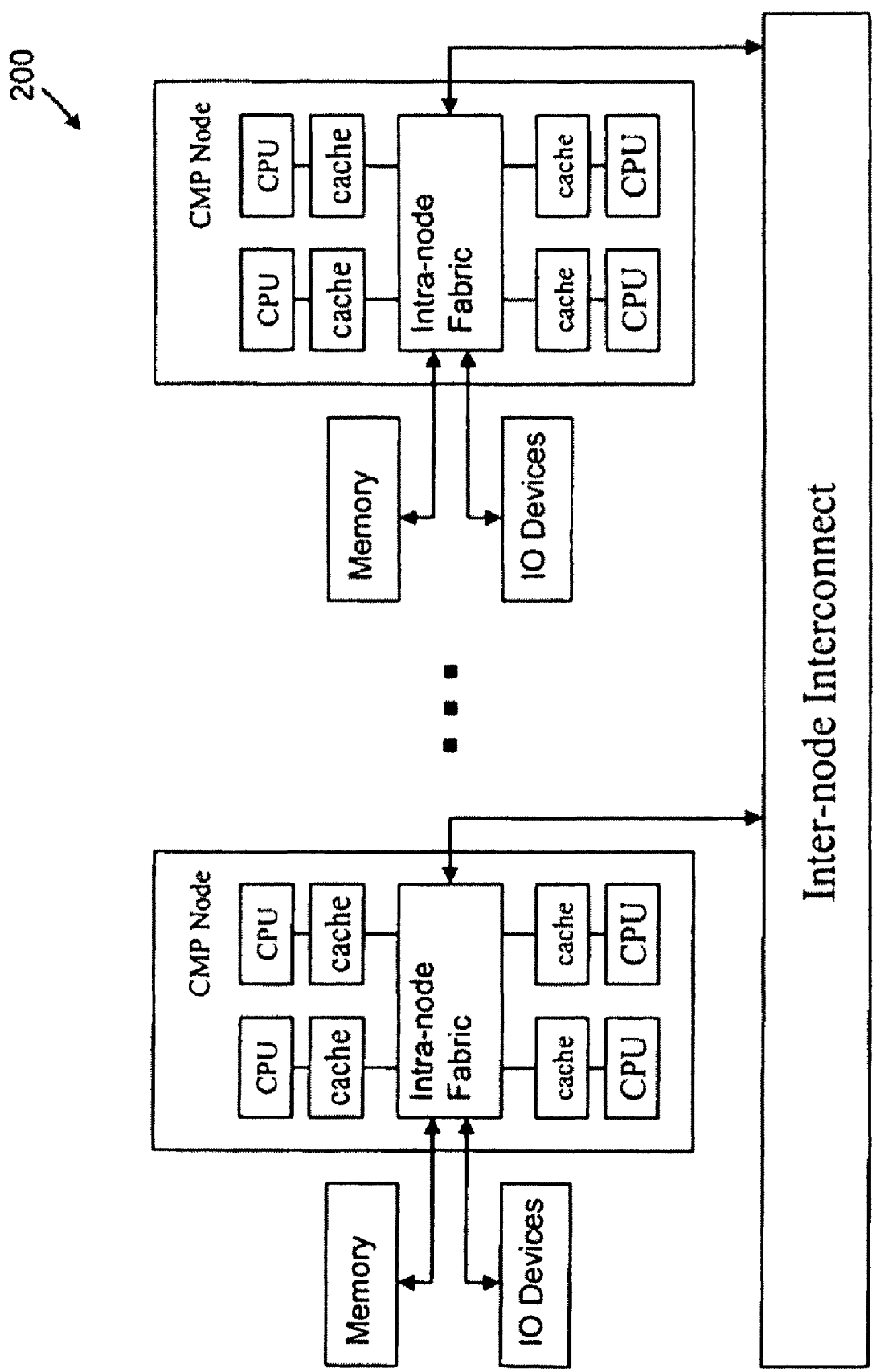
FIG. 2 depicts an exemplary CMP-based SMP system that comprises multiple nodes connected with one another via an inter-node interconnect, wherein each node comprises a CMP subsystem, the CMP subsystem comprising one or more caches that communicate with each other via an intra-node fabric.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims. It is to be understood that the systems and methods described herein may be implemented in various forms of hardware, software, firmware, special purpose processors, or a combination thereof.

In an illustrative embodiment, a cache-coherent multiprocessor system comprises multiple nodes that are connected with each other via an interconnect network. The interconnect network logically comprises an address network and a data network. The address network is used for cache request and snoop response transfers, and the data network is used for data transfers, including both cache-to-cache data transfers and data transfers between caches and the memory. Although logically independent with each other, the address network and the data network may physically share communication pins and links.

Given a memory address, the address network comprises a unique unidirectional ring that can be used to deliver cache requests and cache snoop responses. It should be noted that different memory addresses (at cache line granularities) may use different unidirectional rings for cache coherence messages. In other words, the underlying address network can form more than one unidirectional ring to best utilize available bandwidth, provided that cache requests with the same memory address use the same unidirectional ring.

Figure 3:
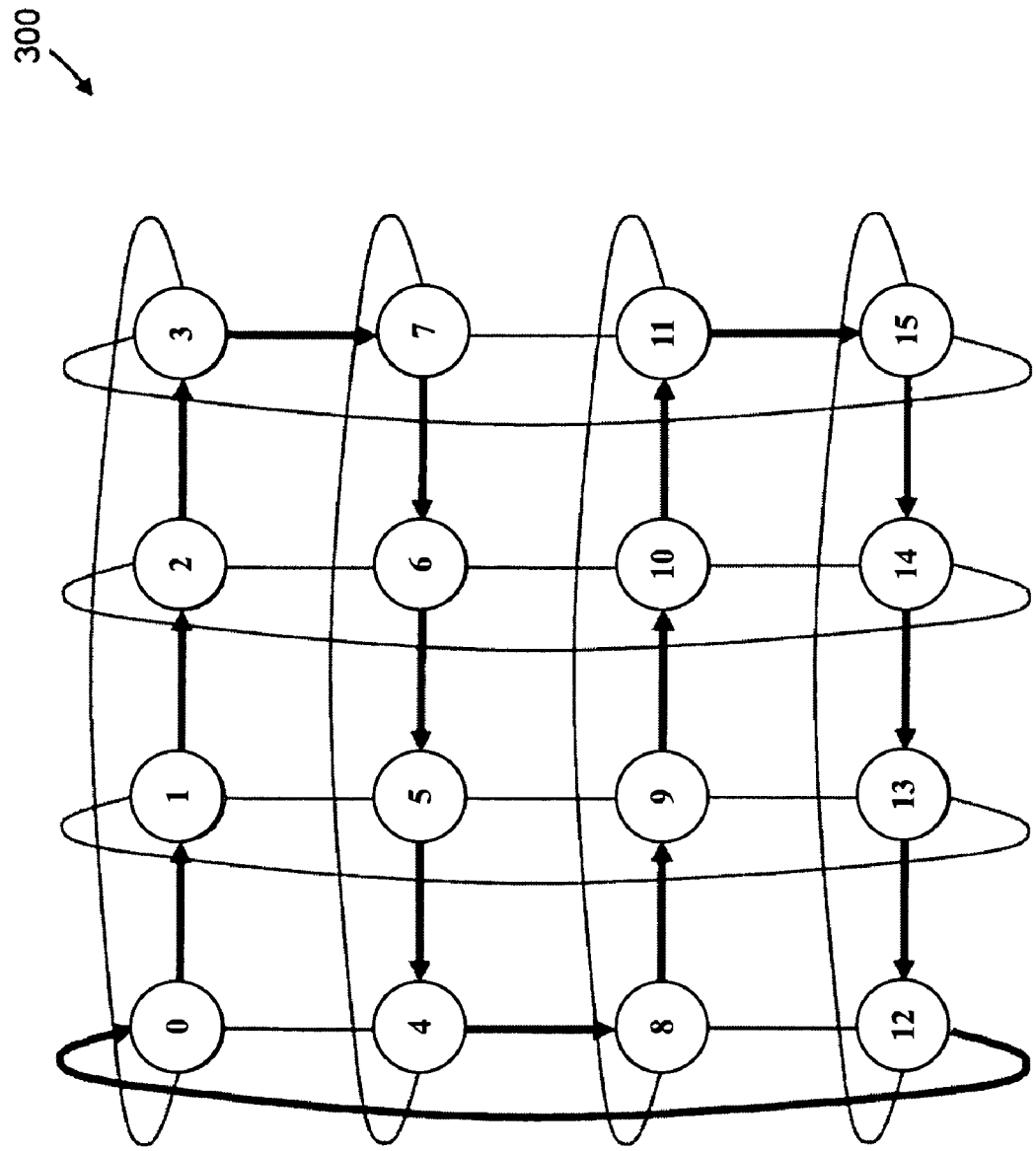
FIG. 3 depicts an exemplary multiprocessor system that comprises multiple nodes connected with one another via a torus network, the torus network comprising a unidirectional ring for delivering cache requests on a memory address.

Referring now to FIG. 3, an exemplary cache-coherent multiprocessor system 300 is shown that uses a torus network to connect 16 nodes, labeled numerically from node 0 to node 15. The torus network comprises a unidirectional ring that can be used to pass cache requests on an address. For example, when node 0 generates a cache request on the address, node 0 can broadcast the cache request to other nodes in the order of 1, 2, 3, 7, 6, 5, 4, 8, 9, 10, 11, 15, 14, 13, and 12. Further, the torus network can support multiple unidirectional rings that can be used for cache requests on different addresses. It is generally desirable to use each communication link of the torus network in the same number of unidirectional rings. To achieve load balance of bandwidth utilization, memory addresses should be properly mapped to the multiple unidirectional rings so that cache requests can be evenly distributed on the multiple unidirectional rings.

A coherence conflict can occur when more than one node issues a cache request regarding the same address simultaneously. Coherence conflicts need to be dealt with appropriately to ensure that the system is coherent and can make forward progress. An exemplary approach for handling a coherence conflict is to service one of the conflicting cache requests while retrying all other conflicting cache requests. For example, when multiple nodes intend to obtain the exclusive ownership of an address, only one node can receive the exclusive ownership. An appropriate fairness mechanism can be used to select which cache request should be serviced in case of a coherence conflict.

When a requesting node issues a read request via the unidirectional ring, the read request can be forwarded to the memory controller that controls the corresponding memory portion, allowing the memory controller to initiate a memory access to retrieve the requested data. However, the memory controller may not supply the data to the requesting node until it is notified to do so. When the requesting node receives the PCSR ("partially combined snoop response") from its preceding node in the unidirectional ring, if the PCSR (which now represents the fully combined snoop response) indicates that the requested data is not supplied by any other node, the requesting node sends a memory read signal to the memory controller so that the data can be supplied from the memory. It should be noted that the memory read signal may be transferred by a message-passing path other than the unidirectional ring.

Lazy Forwarding vs. Eager Forwarding

When a node in the unidirectional ring receives a cache request, it needs to perform a cache snoop operation and pass the cache request to the subsequent node along the unidirectional ring. There are two basic approaches for dealing with a read request, namely lazy forwarding and eager forwarding. With lazy forwarding, when a node receives a read request, the node (a) performs an intra-node cache snoop operation to generate an intra-node snoop response; (b) computes a new PCSR ("partially combined snoop response") from the intra-node snoop response and the PCSR from the preceding node; and (c) forwards the read request with the new PCSR to the subsequent node in the unidirectional ring.

With eager forwarding, when a node receives a read request, the node performs an intra-node snoop operation, and meanwhile, forwards the read request to the subsequent node in the unidirectional ring without waiting for the intra-node cache snoop operation to complete. When the intra-node cache snoop operation later completes, the node computes a new PCSR from the intra-node snoop response and the PCSR from the preceding node, and forwards the new PCSR to the subsequent node in the unidirectional ring.

Compared with eager forwarding, lazy forwarding consumes less communication bandwidth, since a read request and the corresponding PCSR are delivered as one message. Furthermore, when a node receives a read request, if the requested data can be supplied from the node, lazy forwarding allows the read request to pass through remaining nodes in the unidirectional ring without invoking any cache snoop operation. A major drawback of lazy forwarding is that it may increase the latency to service a cache miss, since an intra-node cache snoop operation may take many cycles to complete. Thus, it is generally desirable to properly combine lazy forwarding and eager forwarding to leverage the advantages associated with both approaches.

In the illustrative embodiment, each node comprises a snoop-and-forward prediction mechanism (also simply referred to as SF predictor) that predicts whether lazy forwarding or eager forwarding is used in processing an incoming read request. A snoop-and-forward prediction mechanism in a node generally predicts lazy forwarding if the node is likely to supply the requested data to the requesting node. Likewise, a snoop-and-forward mechanism in a node generally predicts eager forwarding if the node is unlikely to have a copy of the requested data that can be supplied to the requesting node.

Figure 4:
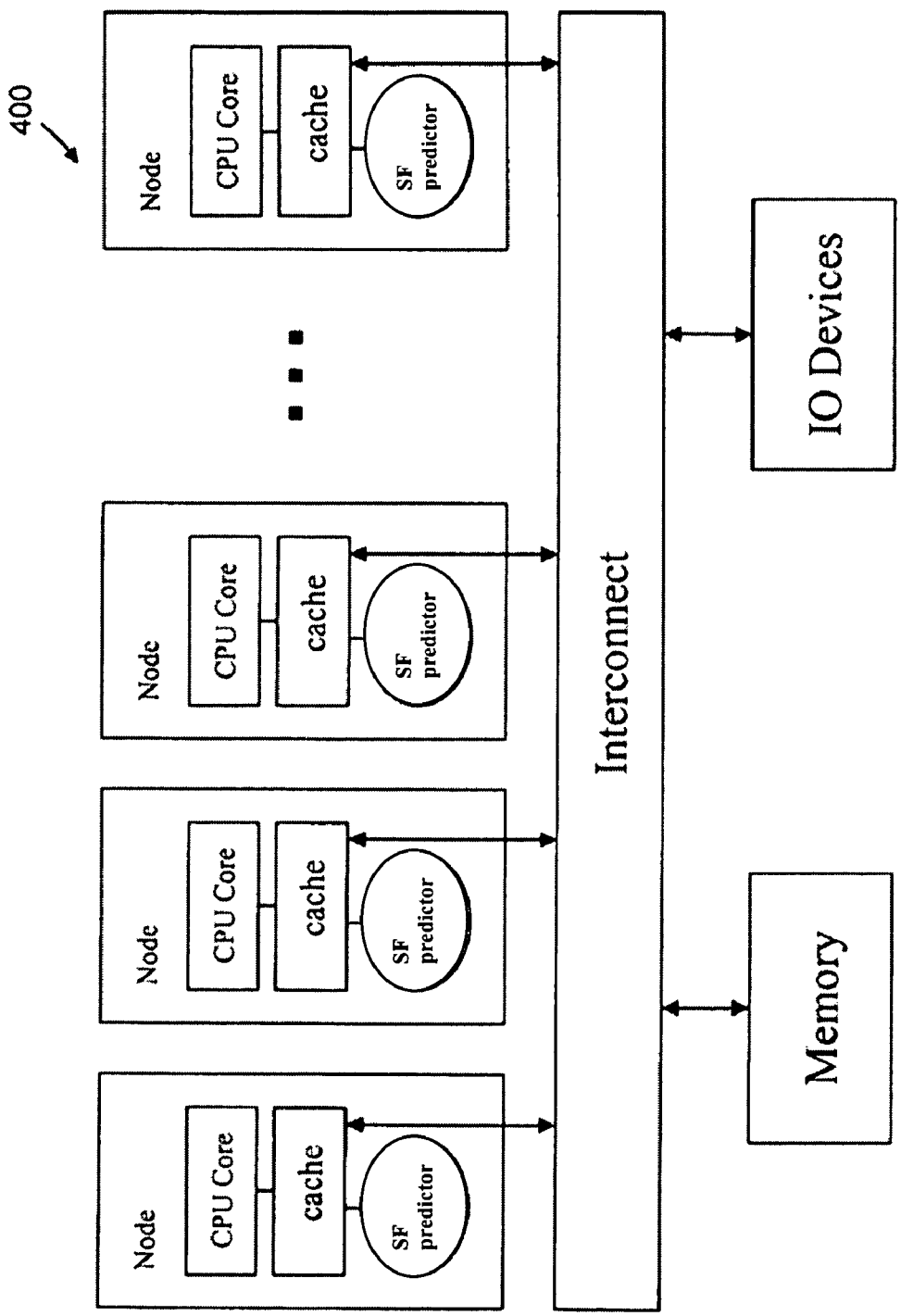
FIG. 4 depicts an SMP system with snoop-and-forward prediction mechanisms, in accordance with one exemplary embodiment of the present invention.

Referring now FIG. 4, an exemplary cache-coherent multiprocessor system 400 comprises multiple nodes that are interconnected via an interconnect network, wherein each node comprises an SF predictor that predicts whether lazy or eager forwarding is used when the node receives a read request.

Figure 5:
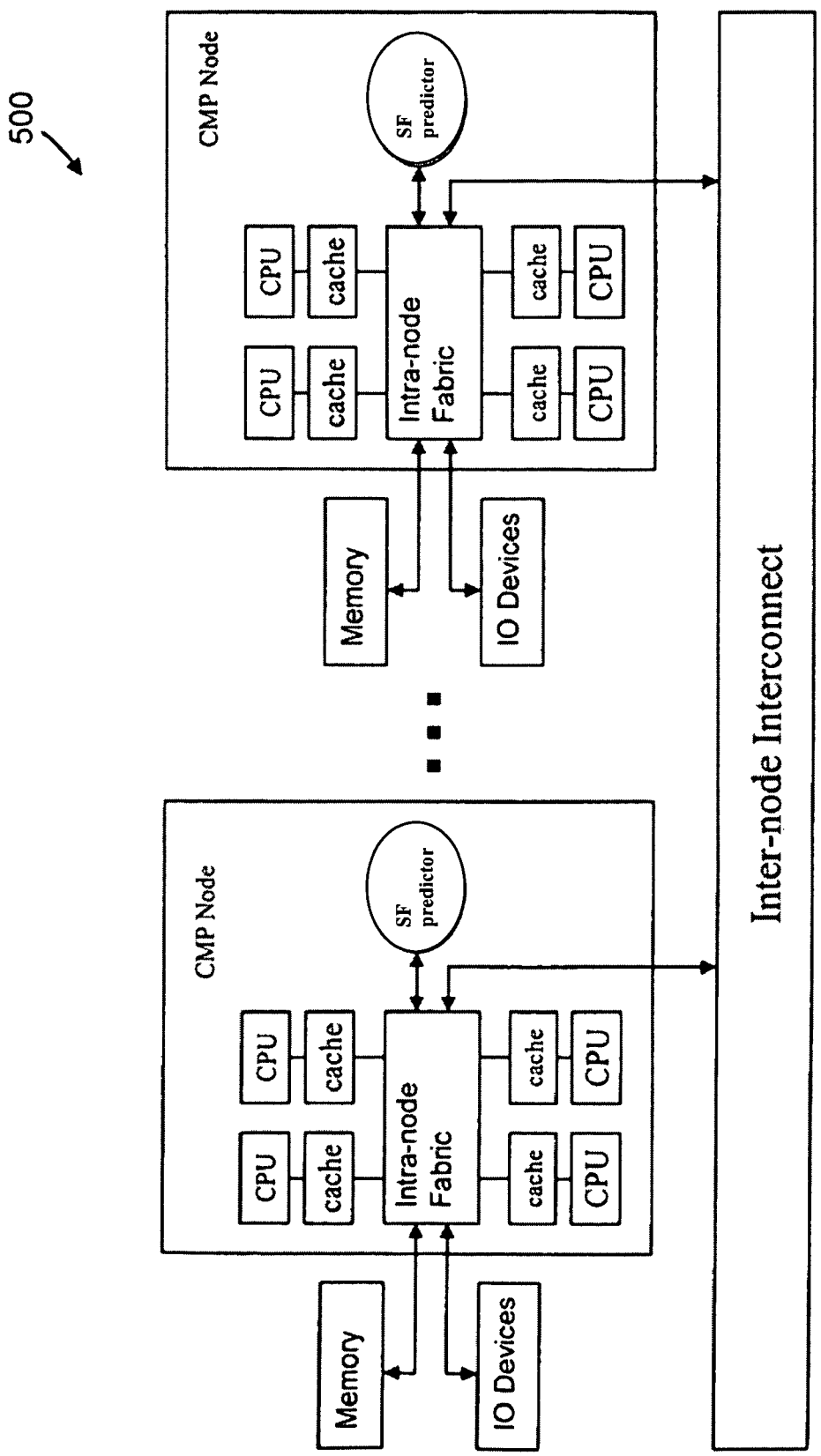
FIG. 5 depicts a CMP-based SMP system with snoop-and-forward prediction mechanisms, in accordance with one exemplary embodiment of the present invention.

Referring now to FIG. 5, another exemplary cache-coherent multiprocessor system 500 comprises multiple CMP nodes that are interconnected via an inter-node interconnect network, wherein each CMP node comprises an SF predictor that predicts whether lazy or eager forwarding is used when the node receives a read request.

It should be noted that snoop-and-forward prediction can be used for all nodes including requesting nodes. For example, when a requesting cache in a requesting node generates a read request, the requesting node can use the corresponding SF predictor to determine whether lazy forwarding or eager forwarding should be used. With lazy forwarding, the requesting node sends no cache request to other nodes, if the requested data can be supplied from another cache in the requesting node.

When adaptive lazy and eager forwarding, there are three types of coherence messages regarding a read request: (1) read request without PCSR, (2) read request with PCSR, and (3) PCSR. We now show how such messages are handled in cache-coherent multiprocessor systems with snoop-and-forward prediction support.

(1) Handling of a Read Request without PCSR

Figure 6:
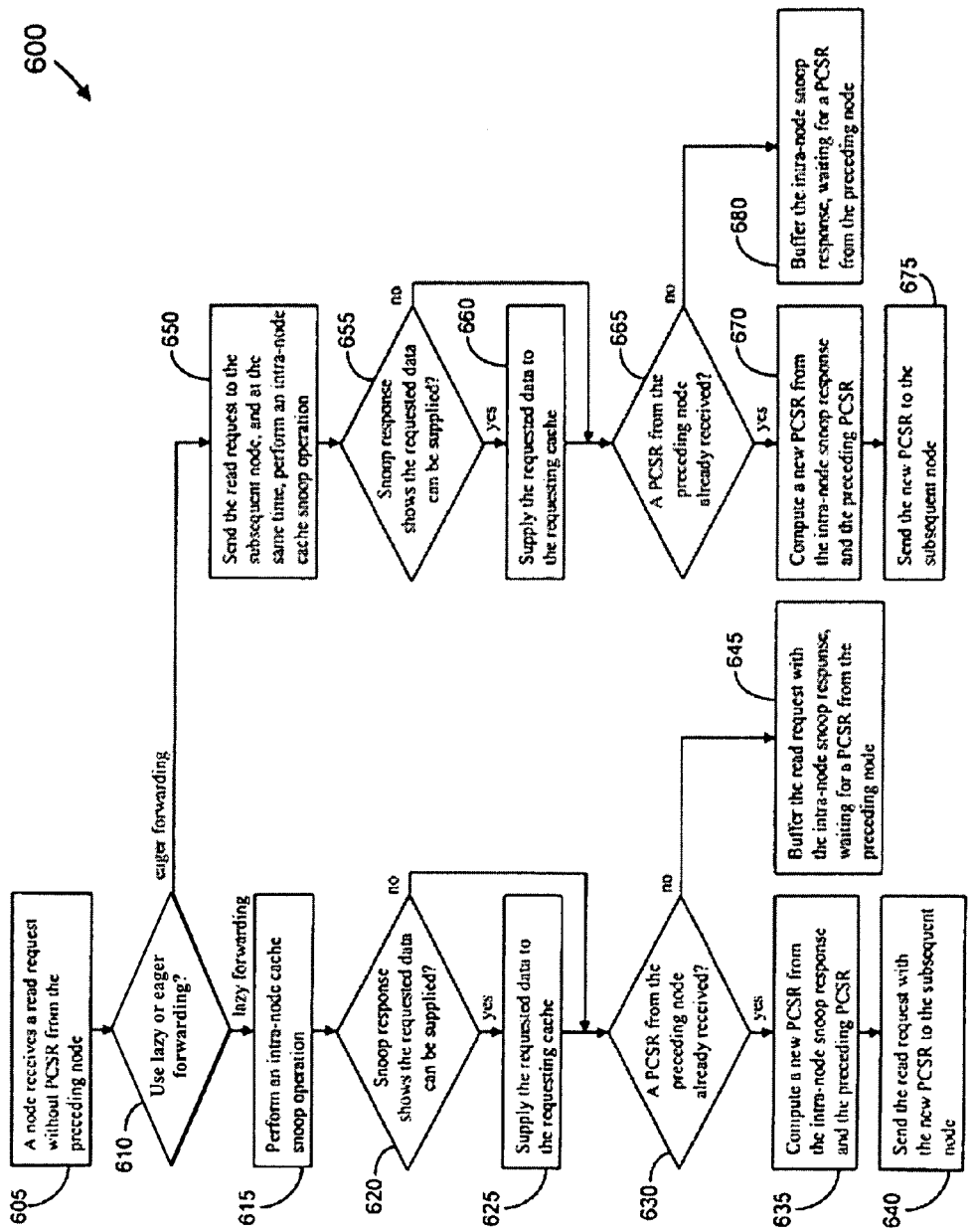
FIG. 6 depicts a flow diagram illustrating how a node handles an incoming read request without PCSR ("partially combined snoop response"), in accordance with one exemplary embodiment of the present invention.

FIG. 6 shows a flow diagram 600 illustrating how a node handles an incoming read request without PCSR. When a node receives (at 605) a read request without PCSR from the preceding node, the SF predictor in the node predicts (at 610) whether lazy forwarding or eager forwarding should be used.

In case of lazy forwarding, the node performs (at 615) an intra-node cache snoop operation to determine (at 620) whether the requested data can be supplied from a cache in the node. If the requested data can be supplied from the node, the node supplies (at 625) the requested data to the requesting node. When the intra-node cache snoop operation completes, the node checks (at 630) whether a PCSR from the preceding node has been received. If the preceding PCSR has been received, the node computes (at 635) a new PCSR by properly combining the intra-node snoop response and the preceding PCSR, and sends (at 640) the read request with the new PCSR to the subsequent node in the unidirectional ring. However, if the preceding PCSR has not been received, the node buffers (at 645) the read request with the intra-node snoop response for future processing.

In case of eager forwarding, the node immediately sends (at 650) the read request to the subsequent node in the unidirectional ring. Meanwhile, the node performs (at 650) an intra-node cache snoop operation. If the intra-node snoop response shows (at 655) that the requested data can be supplied from the node, the node supplies (at 660) the requested data to the requesting node. When the intra-node cache snoop operation completes, if a PCSR has been received from the preceding node, the node computes (at 670) a new PCSR from the intra-node snoop response and the preceding PCSR, and sends (at 675) the new PCSR to the subsequent node in the unidirectional ring. However, if the preceding PCSR has not been received, the node buffers (at 680) the intra-node snoop response for future processing.

Figure 7:
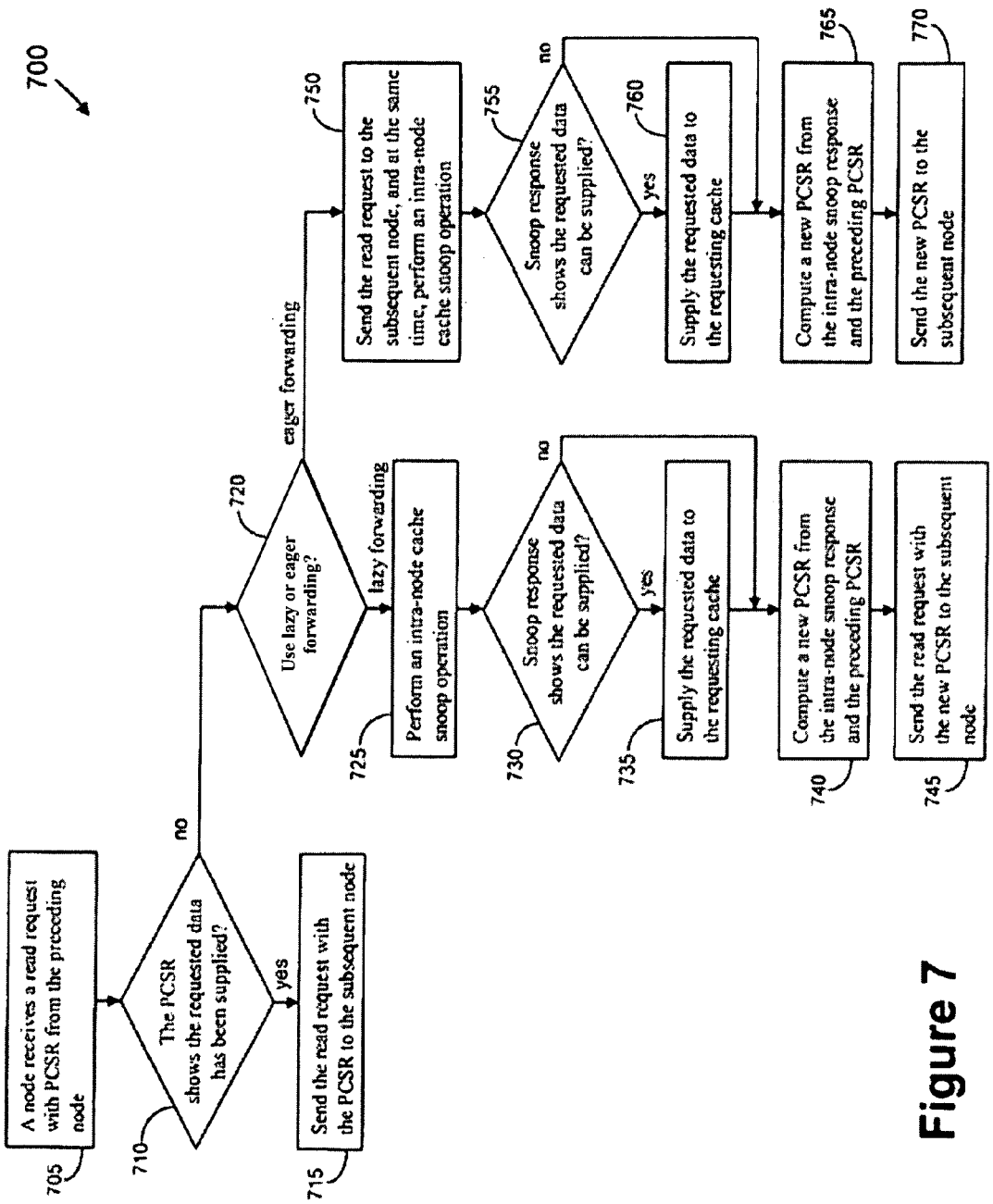
FIG. 7 depicts a flow diagram illustrating how a node handles an incoming read request with PCSR, in accordance with one exemplary embodiment of the present invention.

(2) Handling of a Read Request with PCSR FIG. 7 shows a flow diagram 700 illustrating how a node handles an incoming read request with PCSR. When a node receives (at 705) a read request with PCSR from the preceding node, if the PCSR indicates (at 710) that the read request has already been serviced, the node forwards (at 715) the read request with the PCSR to the subsequent node in the unidirectional ring. If the PCSR shows (at 710) that the read request has not been serviced yet, the SF predictor in the node predicts (at 720) whether lazy forwarding or eager forwarding should be used.

In case of lazy forwarding, the node performs (at 725) an intra-node cache snoop operation to determine (at 730) whether the requested data can be supplied from a cache in the node. If the requested data can be supplied from the node, the node supplies (at 735) the requested data to the requesting node. When the intra-node cache snoop operation completes, the node computes (at 740) a new PCSR from the intra-node snoop response and the preceding PCSR, and sends (at 745) the read request with the new PCSR to the subsequent node in the unidirectional ring.

In case of eager forwarding, the node immediately sends (at 750) the read request to the subsequent node in the unidirectional ring. Meanwhile, the node performs (at 750) an intra-node cache snoop operation. If the intra-node snoop response shows (at 755) that the requested data can be supplied from the node, the node supplies (at 760) the requested data to the requesting node. When the intra-node cache snoop operation completes, the node computes (at 765) a new PCSR from the intra-node snoop response and the preceding PCSR, and sends (at 770) the new PCSR to the subsequent node in the unidirectional ring.

Figure 8:
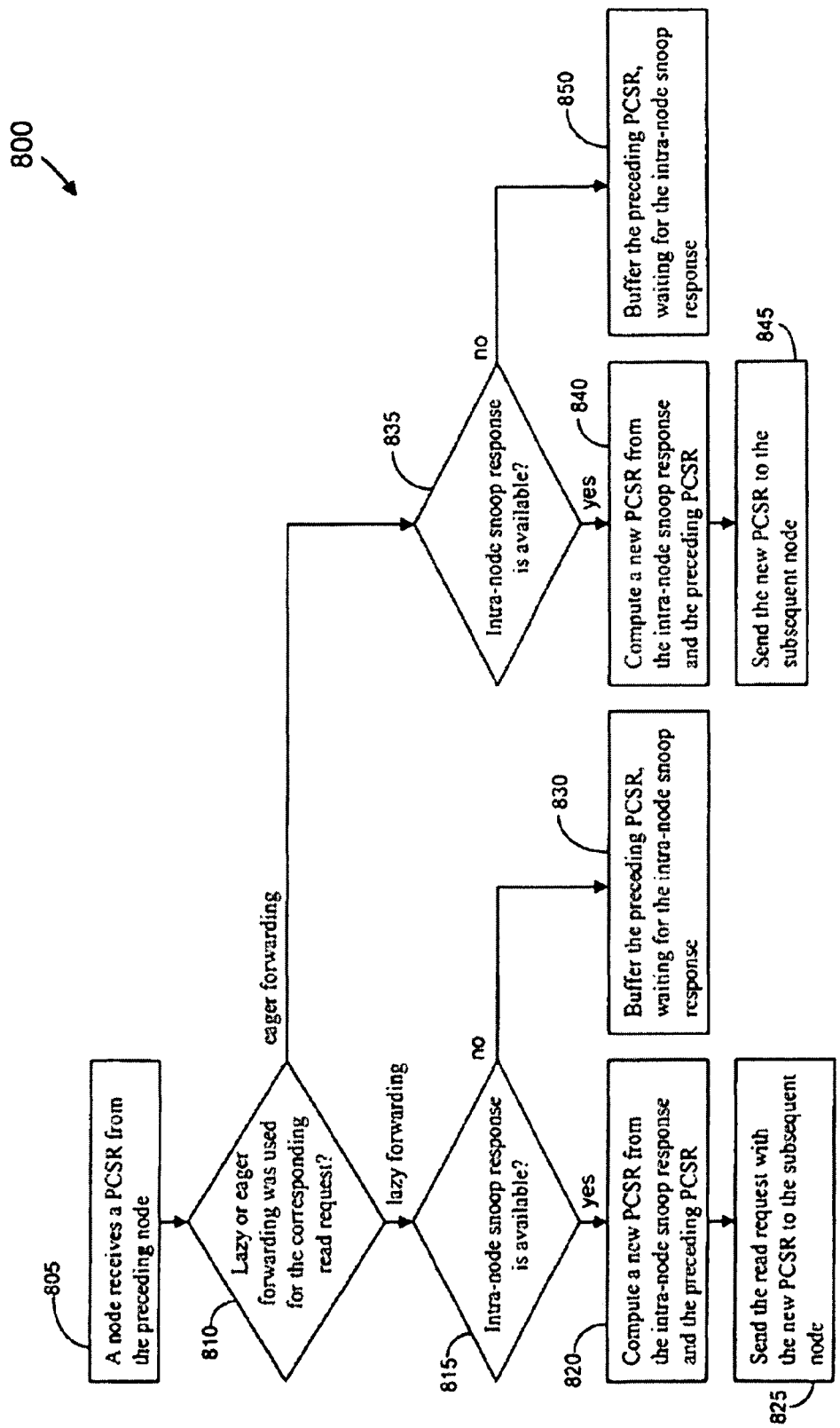
FIG. 8 depicts a flow diagram illustrating how a node handles an incoming PCSR, in accordance with one exemplary embodiment of the present invention.

(3) Handling of a PCSR FIG. 8 shows a flow diagram 800 illustrating how a node handles an incoming PCSR. When a node receives (at 805) a PCSR from the preceding node, there are two possible cases, depending on whether lazy forwarding or eager forwarding was used (at 810) in handling the corresponding read request.

If lazy forwarding was used in handling the corresponding read request, the node checks (at 815) whether the corresponding intra-node snoop response is available. If the intra-node cache snoop operation has been completed, the node computes (at 820) a new PCSR from the intra-node snoop response and the preceding PCSR, and sends (at 825) the read request (which is buffered in the node) with the new PCSR to the subsequent node in the unidirectional ring. However, if the intra-node cache snoop operation has not been completed, the node buffers (at 830) the preceding PCSR for future processing. The buffered PCSR will be processed when the intra-node cache snoop operation is completed.

If eager forwarding was used in handling the corresponding read request, the node checks (at 835) whether the corresponding intra-node snoop response is available. If the intra-node cache snoop operation has been completed, the node computes (at 840) a new PCSR from the intra-node snoop response and the preceding PCSR, and sends (at 845) the new PCSR to the subsequent node in the unidirectional ring. However, if the intra-node cache snoop operation has not been completed, the node buffers (at 850) the preceding PCSR for future processing. The buffered PCSR will be processed when the intra-node cache snoop operation is completed.

Snoop-and-Forward Prediction

Snoop-and-forward prediction can be either sender-based or receiver-based. With sender-based snoop-and-forward prediction, when a requesting node generates a cache request, the requesting node makes proper snoop-and-forward predictions for one or more subsequent nodes and attaches the prediction results with the cache request. As a result, when a subsequent node receives a cache request, the subsequent node chooses lazy forwarding or eager forwarding according to the snoop-and-forward prediction results associated with the cache request. With receiver-based snoop-and-forward prediction, when a node receives a cache request, the node performs a snoop-and-forward prediction, based on appropriate information maintained at the node, to determine whether lazy forwarding or eager forwarding should be used at the node.

In a first exemplary implementation of snoop-and-forward prediction, the snoop-and-forward prediction mechanism in a node comprises prediction table, wherein each table entry records an address of a cache line that can supply its data to another node. When a cache in the node receives data of a cache line and the data of the cache line can be supplied to another node, the prediction table records the address of the cache line. If the prediction table is full, a least recently used ("LRU") policy can be used to determine which address should be evicted from the prediction table.

When the node receives a read request, if the corresponding address is found in the prediction table, the snoop-and-forward prediction mechanism suggests that lazy forwarding be used. However, if the corresponding address is not found in the prediction table, the snoop-and-forward mechanism can suggest that either eager forwarding be used, or another prediction approach be used to determine whether lazy forwarding or eager forwarding should be used.

In a second exemplary implementation of snoop-and-forward prediction, the snoop-and-forward prediction mechanism in a node comprises a prediction table, wherein each table entry comprises an address of a memory region, and a counter that indicates the number of cache lines in the memory region that the node can supply their data to another node. When the node receives data of a cache line and the data of the cache line can be supplied to another node, if the memory region address is not found in the prediction table, the prediction table records the memory region address and sets the corresponding counter to an initial value, such as 1. If the memory region address is found in the prediction table, the prediction table increments the corresponding counter, for example, by 1. The prediction table can be organized as a cache, wherein an appropriate replacement policy such as LRU can be used to choose a victim table entry that needs to be replaced.

When the node receives a read request, the snoop-and-forward prediction mechanism suggests that lazy forwarding be used, if the memory region address is found in the prediction table, and if the corresponding counter is above some pre-defined threshold. The snoop-and-forward mechanism suggests that eager forwarding be used, if the corresponding address is not found in the prediction table, or if the corresponding counter is not above the pre-defined threshold.

In a third exemplary implementation of snoop-and-forward prediction, the snoop-and-forward prediction mechanism in a node comprises a hash table, wherein each table entry comprises one valid bit. At least one hash function is defined to map an address to at least one table entry. When the node receives data of a cache line and the data of the cache line can be supplied to another node, the node sets the valid bit for each of the at least one table entry indexed by the at least one hash function.

An appropriate mechanism can be used to clear valid bits at appropriate times. For example, each table entry can further comprise a time-to-live counter that is decremented periodically. The time-to-live counter is set to some initial value when the corresponding valid bit is set. When the time-to-live counter reaches a floor value, such as 0, the corresponding valid bit is cleared.

When the node receives a read request, if the valid bit is set in each of the at least one table entry indexed by the at least one hash function, the snoop-and-forward prediction mechanism suggests that lazy forwarding be used.

Snoop Filtering Enhancement

A snoop-and-forward prediction mechanism can be enhanced seamlessly with an appropriate snoop filter to avoid unnecessary intra-node cache snoop operations. When a node receives an incoming cache request, the corresponding snoop filter can determine with certainty whether the incoming cache request should be filtered without performing an intra-node cache snoop operation. For example, if the snoop filter suggests that a read request be filtered, then either the requested data cannot be found in the node, or even though the requested data is cached in the node, the requested data cannot be supplied from the node. In contrast, if the snoop filter suggests that a read request not be filtered, then the requested data may be supplied from the node.

We now show how snoop filtering can be used to reduce intra-node cache snoop operations in handling read requests. When a node receives a read request without PCSR from the preceding node, the node uses the snoop filter to determine whether an intra-node cache snoop operation is needed, regardless of whether lazy forwarding or eager forwarding is used. If the snoop filter determines that the requested data cannot be supplied from any cache in the node, the node needs to perform no intra-node cache snoop operation.

When a node receives a read request with PCSR from the preceding node, the node uses the snoop filter to determine whether an intra-node cache snoop operation is needed. If the snoop filter shows that the requested data cannot be supplied from any cache in the node, the node can immediately forward the read request with PCSR to the subsequent node in the unidirectional ring. The node needs to choose between lazy forwarding and eager forwarding only when the snoop filter indicates that requested data may be supplied from a cache in the node.

Like snoop-and-forward prediction, snoop filtering can be either sender-based or receiver-based. With sender-based snoop filtering, when a requesting node generates a cache request, the requesting node determines whether the cache request can be filtered in other nodes and attaches the snoop filtering information with the cache request. As a result, when a subsequent node receives a cache request, the subsequent node determines whether an intra-node cache snoop operation is needed according to the snoop filtering information associated with the cache request. With receiver-based snoop filtering, when a node receives a cache request, the node determines whether caches in the node should be snooped, based on appropriate filtering information maintained in the node.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system of adaptive snoop-and-forward, comprising:
a node comprising at least one cache;
a preceding node;
a subsequent node;
an interconnect network operatively connecting the node, the preceding node and the subsequent node, wherein the preceding node is preceding to the node in the interconnect network, and wherein the subsequent node is subsequent to the node in the interconnect network;
an adaptive snoop-and-forward mechanism comprising a snoop-and-forward prediction mechanism, wherein, when the node receives a cache request from the preceding node, the snoop-and-forward prediction mechanism determines one of lazy forwarding or eager forwarding be used in handling the cache request,
wherein, if the snoop-and-forward prediction mechanism determines that lazy forwarding be used, the node forwards the cache request to the subsequent node after completing an intra-node cache snoop operation;

wherein, if the snoop-and-forward prediction mechanism determines that eager forwarding be used, the node forwards the cache request to the subsequent node before completing an intra-node cache snoop operation; and wherein the node generates a partially combined snoop response (PCSR) by combining an intra-node cache snoop response with a preceding PCSR from the preceding node, and sends the PCSR to the subsequent node.

2. The system of claim 1, wherein the snoop-and-forward prediction mechanism determines that lazy forwarding be used, if requested data of the cache request is likely to be supplied from the node; and wherein the snoop-and-forward prediction mechanism determines that eager forwarding be used, if requested data of the cache request is unlikely to be supplied from the node.

3. The system of claim 1, wherein the intra-node cache snoop operation generates an intra-node cache snoop response, the intra-node cache snoop response indicating whether requested data of the cache request is supplied from the at least one cache in the node.

4. The system of claim 1, wherein, if the snoop-and-forward mechanism determines that lazy forwarding be used, the node piggybacks the PCSR to the cache request forwarded from the node to the subsequent node; and wherein, if the snoop-and-forward mechanism determines that eager forwarding be used, the node sends the PCSR, as a message separate from the cache request, from the node to the subsequent node.

5. The system of claim 1, wherein, if the cache request comprises the preceding PCSR that is piggybacked to the cache request, and if the preceding PCSR indicates that requested data of the cache request has already been supplied, the adaptive snoop-and-forward mechanism forwards the cache request to the subsequent node, without performing an intra-node cache snoop operation or a snoop-and-forward prediction.

6. The system of claim 1, wherein the snoop-and-forward prediction mechanism comprises a prediction table, the prediction table comprising a prediction table entry, the prediction table entry recording an address of a cache line in the at least one cache, and indicating that the node can supply data of the address to another node.

7. The system of claim 6, wherein the snoop-and-forward prediction mechanism determines that lazy forwarding be used, if the address of the cache request is found in the prediction table; and wherein the snoop-and-forward prediction mechanism determines that eager forwarding be used, if the address of the cache request is not found in the prediction table.

8. The system of claim 1, wherein the snoop-and-forward prediction mechanism comprises a prediction table, the prediction table comprising a prediction table entry, the prediction table entry recording at least one address representing a memory region, and a counter representing the number of cache lines, in the memory region, that the node can supply to another node.

9. The system of claim 8, wherein the snoop-and-forward prediction mechanism determines that lazy forwarding be used, if a memory region that includes the address of the cache request is found in the prediction table, and the corresponding counter is above a pre-defined threshold; and wherein the snoop-and-forward prediction mechanism determines that eager forwarding be used, if a memory region that includes the address of the cache request is not found in the prediction table, or the corresponding counter is not above a pre-defined threshold.

10. The system of claim 1, wherein the snoop-and-forward prediction mechanism comprises a hash table;

wherein the snoop-and-forward prediction mechanism defines at least one hash function, the at least one hash function maps the address of the cache request to at least one table entry in the hash table, each of the at least one table entry comprising a valid bit;

wherein, when the node receives data of the address, if the data can be supplied to another node, the snoop-and-forward prediction mechanism sets the valid bit for the each of the at least one table entry indicated by applying the at least one hash function to the address.

11. The system of claim 10, wherein the snoop-and-forward prediction mechanism determines that lazy forwarding be used, if the valid bit is set for each of the at least one table entry; and wherein the snoop-and-forward prediction mechanism determines that eager forwarding be used, if the valid bit is not set for at least one of the at least one table entry.

12. The system of claim 1, wherein the snoop-and-forward prediction mechanism is operatively associated with an intra-node cache snoop filter, the intra-node cache snoop filter determining whether the cache request can be filtered in the node; and wherein, when the node receives the cache request, if the intra-node cache snoop filter determines that the cache request can be filtered in the node, the node generates an intra-node cache snoop response without snooping the at least one cache in the node, the intra-node cache snoop response indicating that requested data of the cache request cannot be supplied from the node.

13. The system of claim 1, wherein the interconnect network comprises a unidirectional ring; and wherein the preceding node is preceding to the node in the unidirectional ring, the subsequent node is subsequent to the node in the unidirectional ring, and the unidirectional ring is used to pass the cache request from the preceding node to the node, and from the node to the subsequent node.

14. A system of adaptive snoop-and-forward, comprising:

a node comprising at least one cache;

a preceding node;

a subsequent node;

an interconnect network operatively connecting the node, the preceding node and the subsequent node, wherein the preceding node is preceding to the node in the interconnect network, and wherein the subsequent node is subsequent to the node in the interconnect network;

an adaptive snoop-and-forward mechanism comprising a snoop-and-forward prediction mechanism, wherein, when the node receives a cache request from the preceding node, the snoop-and-forward prediction mechanism determines one of lazy forwarding or eager forwarding be used in handling the cache request, wherein, if the snoop-and-forward prediction mechanism determines that lazy forwarding be used, the node forwards the cache request to the subsequent node after completing an intra-node cache snoop operation;

wherein, if the snoop-and-forward prediction mechanism determines that eager forwarding be used, the node forwards the cache request to the subsequent node before completing an intra-node cache snoop operation; and wherein, if the cache request comprises a preceding partially combined snoop response (PCSR) that is piggybacked to the cache request, and if the preceding PCSR indicates that requested data of the cache request has already been supplied, the adaptive snoop-and-forward mechanism forwards the cache request to the subsequent node, without performing an intra-node cache snoop operation or a snoop-and-forward prediction.

* * * * *